United States Patent
Shah et al.

(10) Patent No.: US 6,558,146 B1
(45) Date of Patent: May 6, 2003

(54) EXTRUSION DEPOSITION MOLDING WITH IN-LINE COMPOUNDING OF REINFORCING FIBERS

(75) Inventors: Suresh Deepchand Shah, Troy, MI (US); Edward Joseph Wenzel, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 149 days.

(21) Appl. No.: 09/685,547

(22) Filed: Oct. 10, 2000

(51) Int. Cl.⁷ .............................. B29C 51/02
(52) U.S. Cl. .................. 425/113; 425/114; 425/258; 425/297; 425/327; 425/375
(58) Field of Search ................. 425/113, 114, 425/258, 297, 327, 375; 264/148, 210.1, 210.6

(56) References Cited

U.S. PATENT DOCUMENTS

| | | | | |
|---|---|---|---|---|
| 4,439,387 A | * | 3/1984 | Hawley | 425/114 |
| 4,873,045 A | * | 10/1989 | Fujita et al. | 264/259 |
| 5,165,941 A | * | 11/1992 | Hawley | 425/327 |
| 5,238,633 A | * | 8/1993 | Jameson | 425/114 |
| 5,268,050 A | * | 12/1993 | Azari | 425/114 |
| 5,401,154 A | * | 3/1995 | Sargent | 425/114 |
| 5,529,652 A | * | 6/1996 | Asai et al. | 425/113 |
| 5,779,961 A | * | 7/1998 | Teutsch | 264/176.1 |
| 6,126,433 A | * | 10/2000 | Svoboda | 425/557 |
| 6,444,153 B1 | * | 9/2002 | Shah et al. | 264/211.21 |

* cited by examiner

Primary Examiner—Jan H. Silbaugh
Assistant Examiner—Joseph Leyson
(74) Attorney, Agent, or Firm—Patrick M. Griffin

(57) ABSTRACT

According to the present invention, an in-line compounding and extrusion deposition compression molding apparatus and method for producing a fiber-reinforced molded structural component is provided. The apparatus comprises an extruder device having an internal cavity formed therein and an extruder screw rotatably disposed within the internal cavity for producing a polymer melt. A deposition die head is disposed at a first end of the device, the deposition die head having a die channel disposed therein for receiving the polymer melt from the device. The apparatus includes at least one fiber element for feeding at least one reinforcing fiber element into the die channel for compounding the at least one reinforcing fiber element with the polymer melt to produce a fiber-reinforced polymer compound. The apparatus additionally includes a mold for receiving the fiber-reinforced polymer compound to form the fiber-reinforced molded structural component.

17 Claims, 4 Drawing Sheets

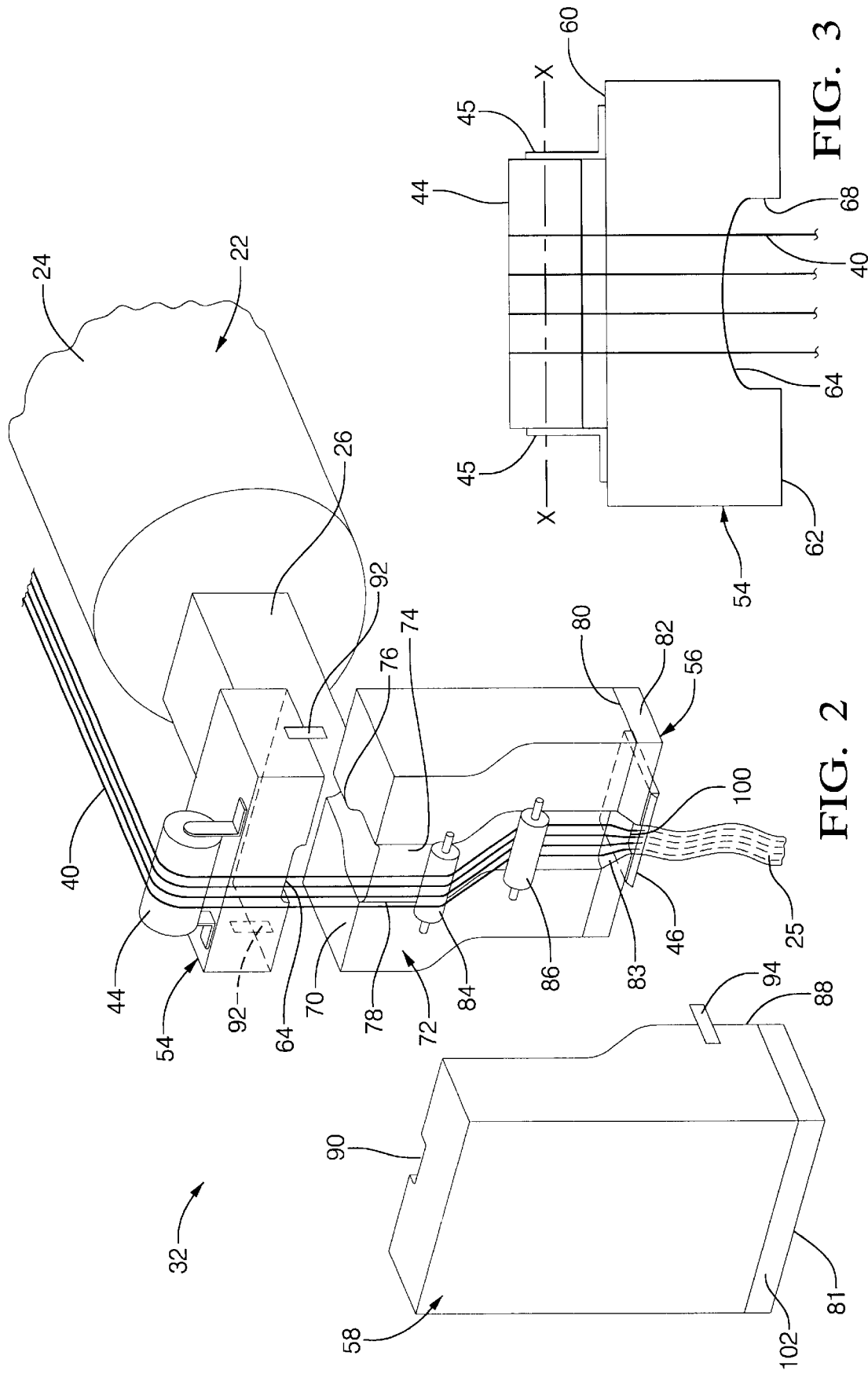

EXTRUSION DEPOSITION MOLDING WITH IN-LINE COMPOUNDING OF REINFORCING FIBERS

TECHNICAL FIELD

The present invention relates generally to the manufacture of fiber-reinforced thermoplastic polymeric structural components and, more particularly, to an apparatus and method for single step, in-line compounding, deposition and compression molding of fiber-reinforced thermoplastic polymeric structural components.

BACKGROUND OF THE INVENTION

Fiber-reinforced thermoplastic polymer structural components are most commonly manufactured from long fiber thermoplastic (LFT) granulates (pellets), glass mat thermoplastic (GMT) sheets, or pultruded sections. Long fiber-reinforced granulates typically consist of glass fiber bundles encapsulated with a thermoplastic through a cable coating or a pultrusion process. LFT granulates can be injection molded but are more commonly extrusion compression molded in order to preserve fiber length in the finished product. Although the damage to LFT granulates during processing is reduced when extrusion compression molded, some damage still occurs during the plastication process due to shear heating.

GMT sheets consist of a needle-punched glass mat impregnated with a thermoplastic polymer (typically polypropylene) to form a glass-reinforced thermoplastic sheet which is subsequently heated and compressed in a vertical compression press to obtain the final part shape. Desired mechanical properties of parts produced from GMT sheets can be custom tailored via the orientation of the glass fibers within the sheet. Overall mechanical properties are as good and many times improved over parts produced from LFT granulates, particularly in the area of impact strength. However, GMT sheets require preheating prior to compression molding and have flow limitations in the direction perpendicular to a die draw.

The pultrusion process is predominantly used in applications where the structural component requires optimal mechanical properties in one direction. Pultrusion typically involves impregnating fiber bundles with a polymer melt while the bundles are passed through a cross-head extrusion die, which also serves to shape the impregnated fibers into a predetermined section. Upon exiting the die, the polymer-impregnated fiber bundles are drawn into a cooling trough and cut to length upon exiting a haul-off unit. If it is desired to reshape these sections, as in compression molding, the sections must be reheated to the point where flow will occur under pressure. Also, the reheated sections require hand lay-up within the mold to obtain the desired fiber orientation.

Polymer components reinforced with fibers may also be manufactured using continuous in-line extrusion methods known in the art. Such methods involve the plastication of a polymer in a first single screw extruder from which the output is fed to a second single screw extruder. Fibers are introduced in the polymer melt in the second extruder either in chopped-segmented form or as continuous strands under a predetermined tension. The fiber-reinforced polymer compound is fed into an accumulator and then applied automatically or in a separate step to a compression molding tool wherein the fiber-reinforced polymer compound is shaped as required for a particular application. Alternatively, the fiber-reinforced polymer compound may be continuously extruded onto a conveyor and sectioned thereupon. The conveyor delivers the sectioned fiber-reinforced polymer compound to a placement assembly which removes the sectioned compound from the conveyor and places the compound upon the compression molding tool.

In-line extrusion methods used in the art to manufacture fiber-reinforced polymer compounds often damage the fibers during processing thus degrading the performance of the final reinforced composite structural component. Introducing fiber into the polymer melt within the extruder exposes the fiber to an extruder screw therein which rotates to create the polymer melt, mix the melt with the fibers, and move the resulting compound toward an outlet of the extruder. The rotation of the screw exerts shear forces upon the fiber resulting in wearing and eventually severance of the fiber. The forces within the extruder may also have an adverse effect upon the screw and the interior of the extruder barrel resulting in increased maintenance and cost. Additionally, the fiber may easily become tangled or otherwise misdistributed within the extruder thus preventing a uniform distribution of the fiber throughout the polymer compound and resulting in an inconsistent disposition of individual fiber lengths.

Furthermore, the fibers within the extruder are exposed to the heat of the polymer melt for a substantial amount of time as the screw moves the fiber-reinforced polymer compound the length of the extruder. The temperature within the extruder can be, for example, in excess of three hundred and fifty degrees Fahrenheit. Natural fibers, which are lower in cost than synthetic fibers and are preferred for their recyclable properties, do not survive exposure to the magnitude of heat present within the extruder and thus tend to complicate the discussed extrusion methods of manufacturing fiber-reinforced polymer structural components discussed above.

Typical methods of extrusion manufacturing of fiber-reinforced polymer structural components do not permit the percentage of reinforcement fibers within the reinforced polymer compound to be varied during compounding or extrusion deposition. Various uses of fiber-reinforced polymer structural components may benefit from a controlled variation of fiber content within the reinforced polymer compound and hence throughout the resulting structural component. For instance, a portion of a particular structural component may require extra reinforcement whereas another portion of the same structural component may require little to no fiber reinforcement. Additionally, the structural component may call for various cross-weavings of the reinforcement fibers. Known extrusion methods allow neither variation of the percentage of fiber throughout the structural component during extrusion and deposition nor variation of the positioning of the fiber, i.e., cross-weaving, as applied to the reinforced structural component upon the compression mold thus limiting the effectiveness of such methods.

SUMMARY OF THE INVENTION

An in-line compounding and extrusion deposition compression molding apparatus for producing a fiber-reinforced molded structural component is provided. The apparatus allows a single step process for forming a polymer melt, extruding the polymer melt through a die channel, compounding the polymer melt in the die channel with at least one reinforcing fiber to form a fiber-reinforced polymer compound, depositing the fiber-reinforced polymer compound onto a compression mold, and molding the reinforced structural component therein.

In a preferred embodiment of the present invention the apparatus comprises a barrel having a body and an internal cavity formed therein. An extruder screw is rotatably disposed within the internal cavity to facilitate extrusion of a polymer melt which is also disposed within the internal cavity. The polymer melt is maintained at a predetermined temperature within the internal cavity of the extruder by the shear frictional forces of the rotating extruder screw and by a temperature mechanism disposed in the barrel. A deposition die head is disposed on a first end of the barrel for receiving the extruded polymer melt from the barrel. The deposition die head includes a die channel with a first opening proximate the barrel, connectively related to the internal cavity, and a second opening distal the barrel. The deposition die head may be releasably mounted to the barrel and the deposition die head, itself, may be comprised of a plurality of releasably mounted parts to facilitate operator access to the die channel. The apparatus further includes at least one fiber element for feeding at least one reinforcing fiber into the die channel of the deposition die head to form a fiber-reinforced polymer compound which is released from the second opening of the deposition die head onto a cavity of an open compression mold. The compression mold closes to form the fiber-reinforced molded structural component.

The apparatus, in a preferred embodiment, is movably disposed such that the apparatus may be maneuvered within the open compression mold in three dimensions, commonly understood to be the x, y, and z coordinate planes. The ambulatory nature of the apparatus allows disposition of the fiber-reinforced polymer compound in various concentrations and arrangements throughout the compression mold cavity. Thus, the amount of fiber reinforcement may be varied within the cavity of the compression mold resulting in a polymer structural component having enhanced reinforcement where desired.

The percentage of fiber within the reinforced polymer compound may also be varied through a simple adjustment of the deposition die head. The deposition die head may be fitted with a die lip which includes a deposition opening through which the fiber-reinforced polymer compound is passed during deposition thereof onto the cavity of the compression molding tool. Utilizing a die lip with a smaller opening allows less of the polymer melt to pass through the deposition opening thus increasing the percentage of reinforcing fibers relative to the volume of polymer melt. Contrariwise, a die lip with a larger opening will produce a fiber-reinforced polymer compound with a lesser percentage of reinforcing fiber relative to the volume of polymer melt.

The present invention further allows the percentage of reinforcing fibers within the fiber-reinforced compound to be varied by introducing additional reinforcing fibers or terminating existing reinforcing fibers mid-stream during formation and deposition of the fiber-reinforced polymer compound. In other words, the number of reinforcing fibers present in the fiber-reinforced compound may be varied in situ thus altering the percentage of fibers within the reinforced compound, hence ultimately in the structural component.

The disposition of fiber within the structural component may also be designated, as alluded to above, by the maneuvering capabilities of the apparatus of the present invention thus allowing, for example, continuous elongated fibers to be positioned congruent with one another or varied creating a cross-weaving fiber arrangement as desired.

Further, the integrity of the fiber is preserved prior to compounding by not introducing the fiber into the extruder barrel at an upstream location thus not subjecting the fiber to damage within the extruder due to the mechanical shear forces induced by the rotation of the screw within the barrel and the heat resulting therefrom. Correspondingly, the extruder is spared the undesired wear associated with introducing the fiber directly into the extruder. Also, the fiber may be maintained at a predetermined tension throughout the compounding process enhancing the alignment of fiber and facilitating the wet-out process while ensuring consistent and uniform distribution of the fiber, thus maximizing the structural benefits of the final reinforced molded component.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which:

FIG. 2 is a perspective view of an exemplary extrusion deposition compounding device of the present invention with an exploded view of a deposition die head;

FIG. 3 is a front elevation view of an upper portion of the deposition die head in an exemplary embodiment;

DETAILED DESCRIPTION OF THE PREFERRED EMBODIMENT

Figure 1:
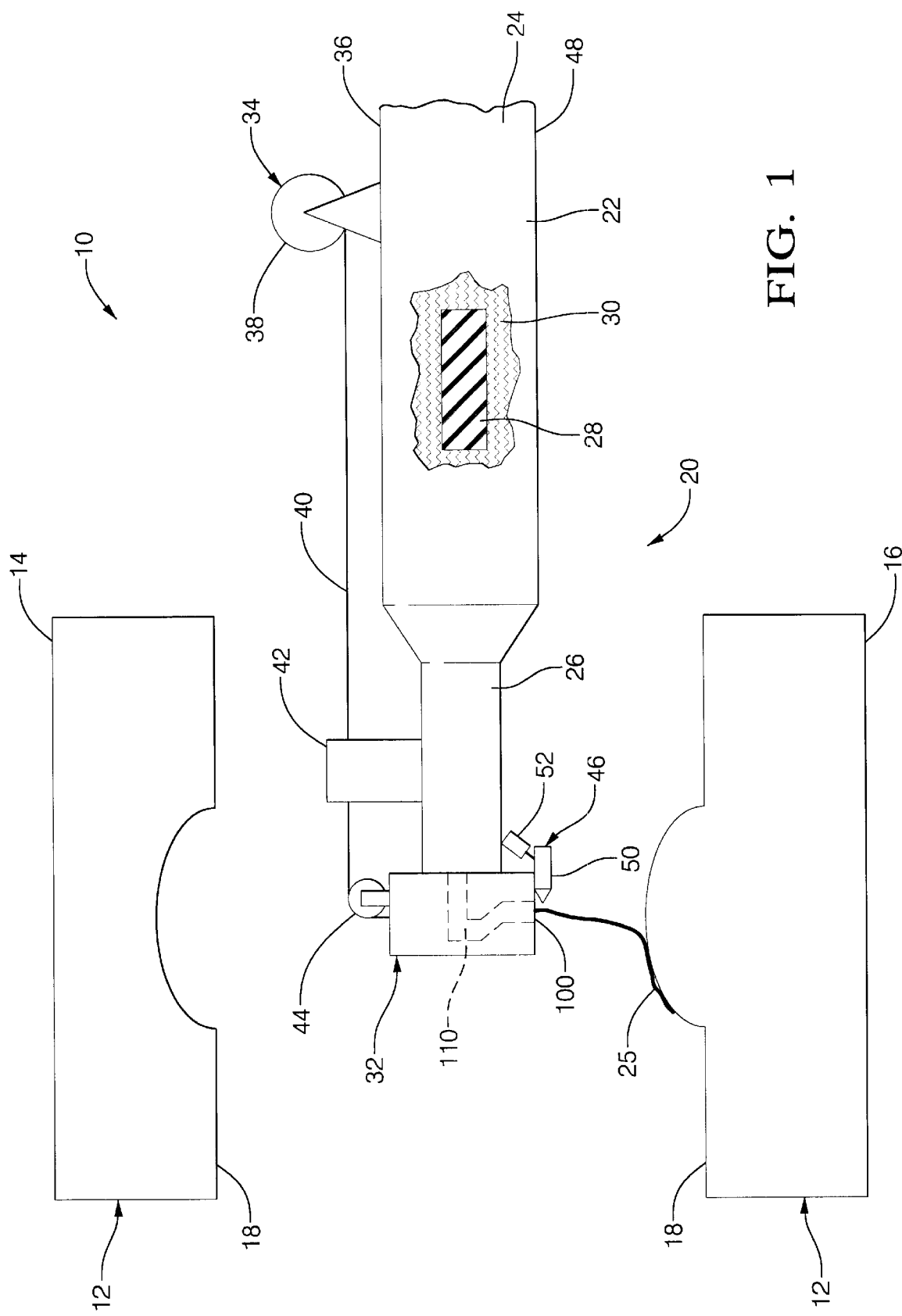
FIG. 1 is a side elevation view of an extrusion deposition compression molding assembly of the present invention.

FIG. 1 depicts an exemplary embodiment of the extrusion deposition compression molding (EDCM) assembly 10 in accordance with the present invention. The EDCM assembly 10 includes a compression mold 12 having a female half 14 and a male half 16, each including a contact surface 18. The female and male halves, 14 and 16 respectively, are complimentary in shape to mate with each other. The compression mold 12 may be a conventional mold generally used for molding polymers to desired shapes and forms. The compression mold 12 is disposed movably on a frame (not shown) so that the contact surfaces 18 may be moved into proximity, the male half 16 moving towards and being received by the female half 14 thus shaping a fiber-reinforced polymer compound 25 disposed therein. More specifically, the fiber-reinforced polymer compound 25 is shaped according to the contour of the contact surfaces 18 of the compression mold 12.

The EDCM assembly 10 further includes an extrusion deposition compounding device 20. The extrusion deposition compounding device 20 includes an extruder 22 which has a body 24 and a neck 26 extending from the body 24. The body 24 includes a screw 28 disposed on an interior thereof. In one embodiment of the present invention, the screw 28 rotates to move a polymer melt 30 towards the neck 26 of the extruder 22. The neck 26 has a channel (not shown) located therein for receiving the polymer melt 30 from the body 24. The screw 28 advances the polymer melt 30 into and through the channel of the neck 26. Another embodiment, according to the present invention, may include a reciprocating screw (not shown) which rotates within the body 24 to extrude the polymer melt 30 towards the neck 26, the reciprocating screw simultaneously moving in a direction away from the neck 26 of the extruder 22 to form a volume of plastic shot proximate the neck 26 of the extruder 22. The reciprocating screw then moves toward the neck 26 plunging the plastic shot of polymer melt 30 into the channel of the neck 26.

The polymer melt 30 is disposed in the interior of the extruder 22 and maintained at a predetermined temperature as discussed herein. A polymer material (not shown) used to form the polymer melt 30 is introduced into the extrusion deposition compounding device 20 by any number of techniques including the use of a hopper (not shown) into which the polymer material is fed. Often, the polymer material is in the form of plastic pellets.

The extrusion deposition compounding device 20 further includes a deposition die head 32 for forming the fiber-reinforced polymer compound 25. The deposition die head 32 is disposed adjacent the neck 26 of the extruder 22 and includes a deposition opening 100 through which the fiber-reinforced polymer compound 25 passes in deposition. FIG. 2 depicts an exploded perspective view of the deposition die head 32.

Figure 9:
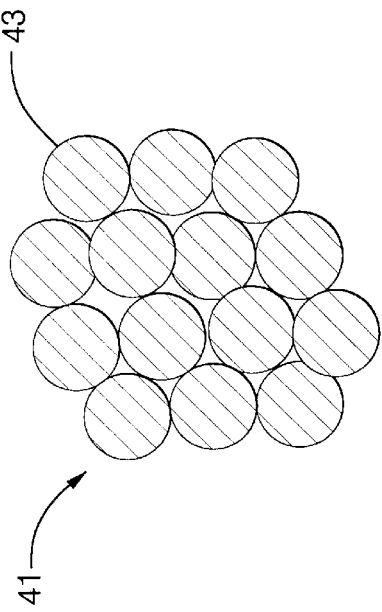
FIG. 9 is a cross-section view of an exemplary fiber bundle.

Referring again to FIG. 1, the extrusion deposition compounding device 20 also includes a fiber assembly 34 disposed on a first side 36 of the extrusion deposition compounding device 20. The fiber assembly 34 includes a fiber supply reel 38 disposed on the first side 36 of the extruder 22. The fiber supply reel 38 contains at least one fiber 40 wound thereabout at a predetermined tension. The at least one fiber may be of synthetic or natural composition. The at least one fiber 40 may further be defined as a needle punched fiber mat strip or any of a plurality of reinforcing materials having a tape form. The at least one fiber 40 traverses the extrusion deposition compounding device 20, through a fiber preheat die 42 to a tension pulley 44 where the at least one fiber 40 enters the deposition die head 32. The at least one fiber 40 may comprise at least one fiber bundle 41 (see FIG. 9). The fiber bundle 41 includes a plurality of individual reinforcing fibers 43. The extrusion deposition compounding device 20 may include a plurality of fiber assemblies 34 depending upon a particular desired reinforcement application. Further, in another embodiment, the fiber assemblies 34 may be disposed on equipment external to the extrusion deposition compounding device 20 including a mobile device (not shown) which correspondingly moves with the device 20 as the fiber-reinforced polymer 25 is deposited upon the compression mold as taught herein. Additionally, the fiber assemblies 34 may be disposed on fixed equipment external to the extrusion deposition compounding device 20, the fiber being translated to the device 20 through, for example, a piped network.

The preheat die 42 is disposed on the first side 36 of the extruder 22 and serves to heat the at least one fiber 40 to a predetermined temperature. The tension pulley 44 is disposed on the first side 36 of the deposition die head 32 and allows the at least one fiber 40 to enter the deposition die head 32 at a predetermined tension as discussed herein. The preheat die 42 may be disposed on the first side 36 between the fiber supply reel 38 and the tension pulley 44.

The extrusion deposition compounding device 20 further includes a severing assembly 46 disposed on a second side 48 of the extrusion deposition compounding device 20. The second side 48 of the extrusion deposition compounding device 20, in a preferred embodiment, is opposite the first side 36. The severing assembly 46 includes a cutting member 50 and an actuator 52, the actuator 52 being disposed connectively with the cutting member 50 so that activation of the actuator 52 causes movement of the cutting member 50.

The deposition die head 32, as depicted in FIG. 2, includes an upper portion 54, a first lower portion 56, and a second lower portion 58. Referring to FIG. 3, the upper portion 54 of the deposition die head 32 includes a top face 60 and a bottom face 62. The bottom face 62, in a preferred embodiment, is opposite the top face 60. The tension pulley 44 is mounted on the top face 60. A plurality of mountings 45 are used to secure the tension pulley 44 to the upper portion 54 and allow the tension pulley 44 to rotate about a longitudinal axis x—x, thus facilitating the introduction of the at least one fiber 40 into the deposition die head 32. The at least one fiber 40 traverses tension pulley 44 and descends in a direction from the top face 60 towards the bottom face 62.

Figure 4:
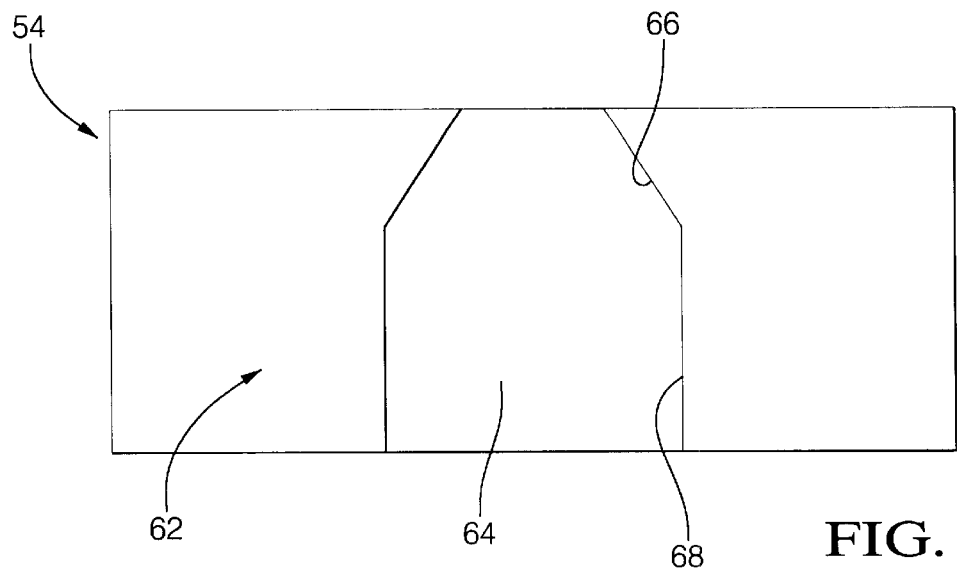
FIG. 4 is a bottom plan view of the upper portion of the deposition die head in an exemplary embodiment.

Referring to FIGS. 1 and 4, the bottom face 62 of the upper portion 54 of the deposition die head 32 includes a first polymer melt channel 64 for receiving the polymer melt 30 from the extruder 22. The first polymer melt channel 64 includes a neck portion 66 which meets the neck 26 of the extruder 22 when the deposition die head 32 is fully assembled and mounted upon the extruder 22 as shown in FIG. 1. The first polymer melt channel 64 further includes a stream portion 68 disposed on the bottom face 62 adjacent the neck portion 66. The neck portion 66 and the stream portion 68 of the first polymer melt channel 64 are of a width sufficient to receive the flow of the polymer melt 30 from the extruder 22 and, in a preferred embodiment, the stream portion 68 has a width greater than that of the neck portion 66. The first polymer melt channel 64, as well, is of sufficient depth to receive the flow of the polymer melt 30 from the extruder 22.

Referring again to FIG. 2, the first lower portion 56 of the deposition die head 32 includes a top surface 70 and a first contoured surface 72. The top surface 70 is disposed substantially perpendicular to the first contoured surface 72. The top surface 70 contacts the bottom face 62 of the upper portion 54 when the deposition die head 32 is assembled. The first lower portion 56 further includes a second polymer melt channel 74 which traverses the top and contoured surfaces 70 and 72, respectively. The second polymer melt channel 74 includes a neck portion 76 disposed on the top surface 70 such that the neck portion 76 is proximate the neck 26 of the extruder 22 and opposite the neck portion 66 of the first polymer melt channel 64 when the deposition die head 32 is fully assembled. The second polymer melt channel 74 also includes a stream portion 78 which is disposed on the top surface 70 adjacent the neck portion 76 such that when the deposition die head 32 is assembled the stream portion 78 of the second polymer melt channel is disposed opposite the stream portion 68 of the first polymer melt channel 64. The first polymer melt channel 64 of the upper portion 54 mates with the second polymer melt channel 74 of the top surface 70 of the first lower portion 56 to form a generally annular die channel 110 (see FIG. 1) when the deposition die head 32 is assembled. More specifically, the neck portion 66 and the stream portion 68 of the first portion 54 mate with the neck portion 76 and the stream portion 78 of the first lower portion 56, respectively, to form the die channel 110. The stream portion 78 of the second channel 74 continues along the first contoured surface 72 toward a bottom surface 80 of the first lower portion 56.

The neck portion 76 and the stream portion 78 are each of a width sufficient to receive the polymer melt 30 from the extruder 22. Likewise, the second polymer melt channel 74 is of sufficient depth to accommodate the polymer melt 30. In one embodiment, the neck portion 76 is narrower in width than the stream portion 78.

The first lower portion 56 of the deposition die head 32 also includes a first die lip 82 releasably disposed at the bottom surface 80. The first die lip 82 includes a tailored polymer melt channel 83 disposed in the first die lip 82 such that when the first die lip 82 is releasably fitted on the first lower portion 56 of the deposition die head 32, the tailored polymer melt channel 83 is aligned with the stream portion 78 of the polymer melt channel 74 thus providing continuity of the channel 74 with the deposition opening 100. The tailored polymer melt channel 83 may descend from the stream portion 78 of the polymer melt channel 74 in a variety of shapes and sizes thereby allowing the width and form of the fiber-reinforced polymer compound 25 to be varied as desired in the formation of particular fiber-reinforced polymer structural components. A plurality of die lips 82 may be used with the EDCM assembly 10, each having tailored polymer melt channels 83 of different geometries thus producing various shaped fiber-reinforced polymer melts 25 from a single EDCM assembly 10.

The first contoured surface 72 further includes a first shear pulley 84 and a second shear pulley 86 each disposed on the first contoured surface 72 to effect a predetermined shear force upon the at least one fibers 40 within the polymer melt 30. In one embodiment, the at least one fiber 40 traverses the first shear pulley 84 such that the first shear pulley 84 is disposed between the at least one fiber 40 and the first contoured surface 72. The at least one fiber 40 further traverses the second shear pulley 86 such that the at least one fiber 40 is disposed between the second shear pulley 86 and the first polymer melt channel 74.

Figure 5:
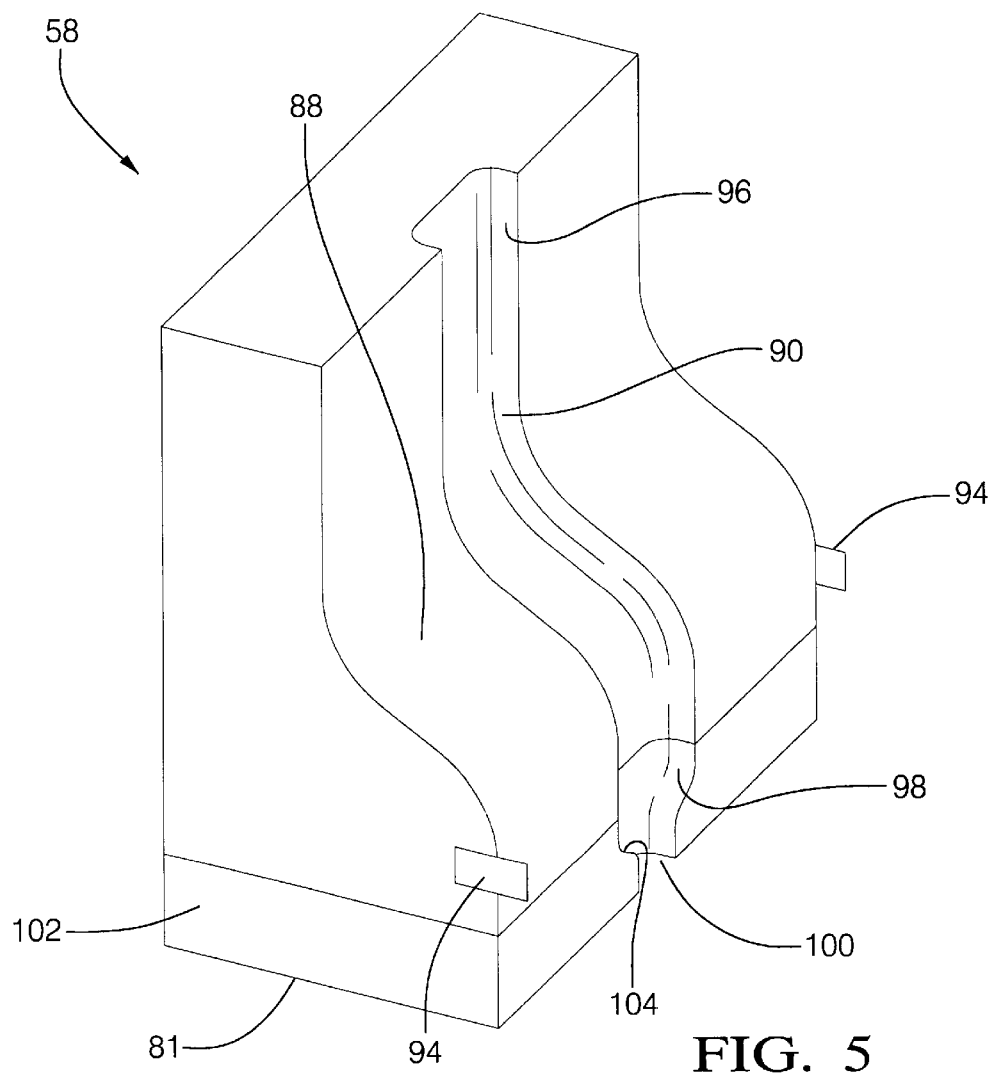
FIG. 5 is a perspective view of a second lower portion of the deposition die head.

The second lower portion 58 of the deposition die head 32 includes a second contoured surface 88 as shown in FIG. 5. The second contoured surface 88 is shaped symmetrical and complementary the first contoured surface 72 such that when the deposition die head 32 is assembled the first and second contoured surfaces 72 and 88, respectively, are received into one another. The second contoured surface 88 includes a third polymer melt channel 90 shaped congruent to the second polymer melt channel 74 formed in the first contoured surface 72. The third polymer melt channel 90 is formed in the second lower portion 58 to lie opposite the second polymer melt channel 74 upon full assemblage of the deposition die head 32. The second polymer melt channel 74 of the first contoured surface 72 mates with the third polymer melt channel 90 of second contoured surface 88 forming the generally annular die channel 110 when the deposition die head 32 is assembled.

The second lower portion 58 of the deposition die head 32 further includes a second die lip 102 releasably disposed at a lower end 81 of the second lower portion 58. The second die lip 102 includes a tailored polymer melt channel 104 disposed so as to align with the third polymer melt channel 90 to provide continuity of the channel 90 with the deposition opening 100. The tailored polymer melt channel 104 may be of a variety of shapes and sizes thus providing for variation of the shape, size, etc. of the fiber-reinforced polymer compound 25, as discussed above with reference to the first die lip 82. The second die lip 102 is disposed on the second lower portion 58 and the tailored polymer melt channel 104 is disposed upon the second die lip 102 such that when the deposition die head 32 is fully assembled, the second die lip 102 and the tailored polymer melt channel 104 are adjacent the first die lip 82 and the tailored polymer melt channel 83, respectively. The interface of the tailored polymer melt channels 83, 98 forms the deposition opening 100.

When assembling the deposition die head 32, the upper portion 54 is secured to the first lower portion 56 with a first set of fasteners 92 such that the bottom face 62 of the upper portion 54 contacts the top surface 70 of the first lower portion 56. The second lower portion 58 is also preferably secured to the first lower portion 56 by a second set of fasteners 94. The first and second sets of fasteners 92 and 94 may be any conventional devices suitable for the use intended. The die lips 82, 102 are fastened to the first lower portion 56 and the second lower portion 58, respectively, by any conventional fastening means suitable for the purposes herein described. Finally, the deposition die head 32 is secured to the neck 26 of the extruder 22 by conventional techniques. In a preferred embodiment, the deposition die head 32 is designed to fit a variety of extruders 22 known and commonly used in the art, thus allowing retro-fit of existing extruders and implementation of the EDCM assembly 10.

A die channel 110, shown in broken lines in FIG. 1, is formed within the deposition die head 32 by the interfacing of the first, second, and third polymer melt channels 64, 74, and 90, respectively. The at least one fiber 40 undergoes the wet-out process and is compounded with the polymer melt 30 within the die channel 110.

The first and second contoured surfaces 72 and 88, respectively, of the deposition die head 32 may include non-planar contours giving the die channel 110 a desired shape to facilitate a wet-out process. The non-planar contours of the first and second contoured surfaces 72 and 88, respectively, may be designed to bend the at least one fiber bundle 41 exposing the individual fibers therein to the polymer melt 30 thereby inducing the wet-out process. In one embodiment, the first and second contoured surfaces 72 and 88, respectively, may be shaped to traverse the die channel 110 first in a vertical manner, then non-vertical, and then again in a vertical manner to the termination of the die channel 110 at the deposition opening 100.

The use of the EDCM assembly 10, in accordance with the present invention, is now described. A polymer or combination of polymers is introduced to the extruder 22 to form the polymer melt 30. In one embodiment the polymer may be a thermoplastic. At least one heating element (not shown) located, preferably, on the exterior of the barrel 22 of the extruder 20, in combination with the shear heat introduced by the rotation of the screw 28, forms the polymer melt 30. The screw 28 rotates in such a manner as to move the polymer melt 30 toward the neck 26 of the extruder 22 and eventually into the deposition die head 32 for compounding with the at least one fiber 40. The heating element maintains the temperature of the polymer melt 30 as required for proper compounding and deposition onto the compression mold 12.

Figure 6:
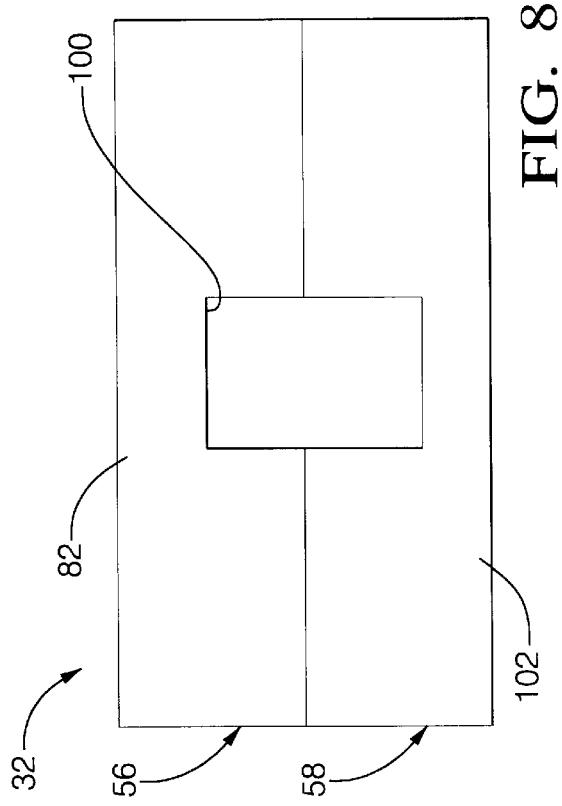
FIGS. 6–8 depict bottom plan views of the deposition die head showing various die lips mounted thereon.
Figure 7:
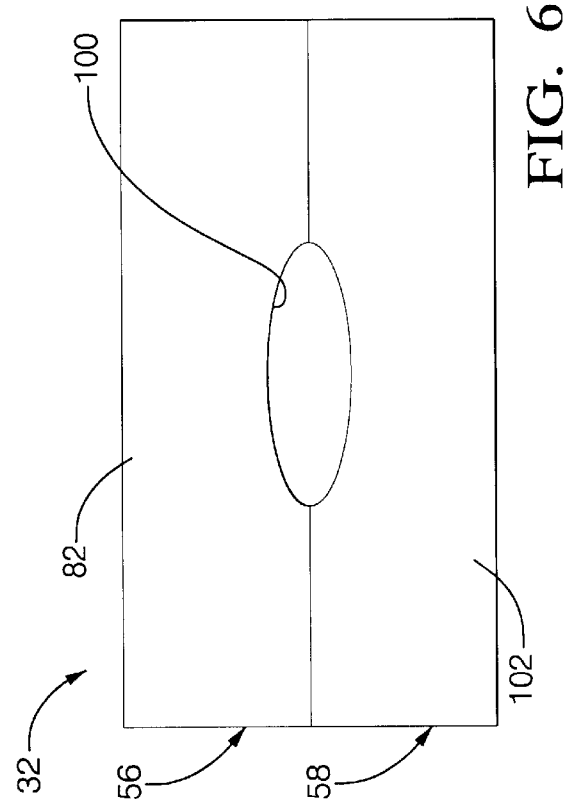
Figure 8:
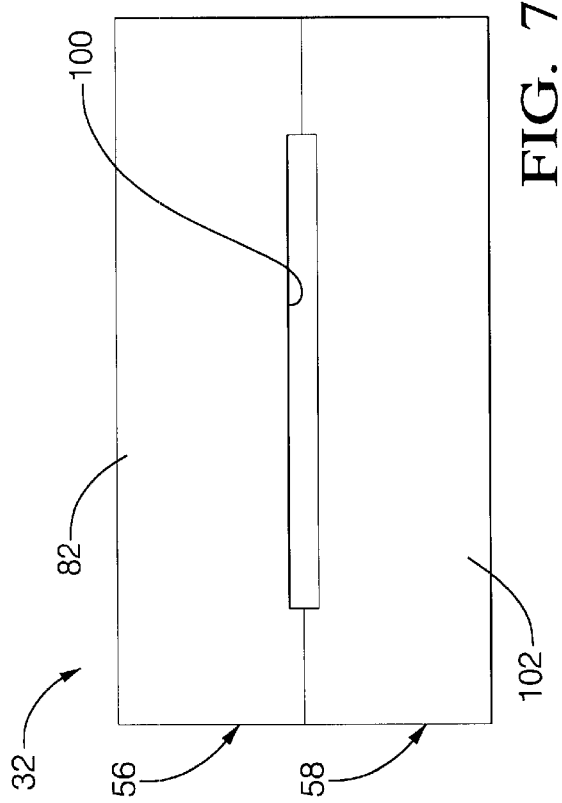

The die lips 82, 102 are fitted onto the deposition die head 32. Die lips 82, 102 with tailored polymer melt channels 83, 104, respectively, are selected to form the deposition opening 100 required for a particular application of the EDCM assembly 10. The deposition opening 100 resulting from the interface of the tailored polymer melt channels 83, 104 may have any desired cross-sectional shape as required to form a specific fiber-reinforced polymer extruded section. FIGS. 6–8 depict exemplary deposition openings 100.

The at least one fiber 40 is introduced into die channel 110 of the deposition die head 32 in such amount as required for the particular use of the reinforced polymer structural component and at such tension as to achieve adequate fiber wet-out. The at least one fiber 40 is heated to a predetermined temperature by the fiber preheat die 42 prior to introduction into the die channel 110. When desired, the polymer melt 30 is extruded into the die channel 110 by the extruder 22. The wet-out process, as is commonly known and understood in the industry, occurs at this point within the die channel 110 of the deposition die head 32.

The extrusion deposition compounding device 20 is movably mounted upon a positioning unit (not shown) which allows the device 20 to be moved, in a preferred embodiment, in three dimensions (x, y, and z coordinate planes) within the compression mold 12. The extrusion deposition compounding device 20 may be brought proximate the contact surface 18 of the male half 16 of the compression mold 12 as shown in FIG. 1.

When desired, by operator command or automatically by computer or robotic command, the extrusion deposition compounding device 20 deposits the fiber-reinforced polymer compound 25 through the deposition opening 100 onto the contact surface 18 of the male half 16 of the compression mold 12. The extrusion deposition compounding device 20 deposits the fiber-reinforced polymer compound 25 on the contact surface 18 of the compression mold 12 in such concentration and in such a distribution as is required to form the desired reinforced polymer structural component. The percentage of fiber 40 within the fiber-reinforced polymer compound 25 may be varied by depositing additional fiber reinforced compound 25 on those portions of the structural member requiring greater reinforcement. Additionally, the fiber-reinforced polymer compound 25 may be deposited in one direction on a first pass of the extrusion deposition compounding device 20 and then in a second direction upon a second pass resulting in a cross-weaving of the at least one fibers 40 in those specific portions of the fiber-reinforced polymer structural component requiring such reinforcement.

Further, the percentage of reinforcing fibers in the resulting compound 25 may be varied by controlling the number of fibers 40 compounded with the melt 30. The at least one reinforcing fiber 40 may be a plurality of reinforcing fibers 40 as shown in FIGS. 1 and 3. Thus, the percentage of reinforcing fibers 40 present in a polymer structural component formed in accordance with the present invention may be varied by increasing or decreasing the plurality of reinforcing fibers 40 compounded with the polymer melt 30 in the deposition die head 32 and deposited on the compression mold 12 as the fiber-reinforced polymer compound 25.

Furthermore, the percentage of reinforcing fibers 40 present in the fiber-reinforced polymer compound 25 and, hence, the resulting fiber-reinforced polymer structural component may be varied by the selection of the die lips 82, 102. Die lips 82, 102 which form a larger deposition opening 100 will allow the passage of a greater volume of polymer melt 30 thus reducing the percentage of reinforcing fibers 40 relative to the volume of the polymer melt 30 deposited from the extrusion deposition compounding device 20. Die lips 82, 102 which form a smaller deposition opening 100 will allow passage of a lesser volume of the polymer melt 30 thus increasing the percentage of reinforcing fibers 40 relative to the deposited volume of polymer melt 30.

The severing assembly 46 is used to terminate the deposition of the fiber-reinforced polymer compound 25 upon the compression mold 12. The extrusion deposition compounding device 20 initiates the actuator 52 which moves the cutting member 50 into engagement with the fiber-reinforced polymer compound 25 thereby severing the compound 25 and terminating deposition.

After deposition of the fiber-reinforced polymer compound 25 upon the contact surface 18 of the compression mold 12, the extrusion deposition compounding device 20 is withdrawn from the compression mold 12. The compression mold 12 is closed, the female half 14, generally located above the male half 16, moves toward and is received by the male half 16. The compound 25 is cooled within the compression mold 12, thus forming the fiber-reinforced polymer structural component.

The type and the amount of the at least one fiber 40 introduced in the die channel 110 of the deposition die head 32 may be easily varied between uses of the EDCM assembly 10 by adjusting the fiber supply reel 38. Additionally, the thickness and shape of the fiber-reinforced compound 25 may be varied between uses of the EDCM assembly 10 by switching between a variety of die lips 82, 102.

The at least one reinforcing fiber 40 may be a plurality of individual reinforcing fibers 40, as discussed above. It is understood that the amount of individual fibers 40 within the plurality of reinforcing fibers 40 may be varied during the production of the fiber-reinforced polymer structural component in accordance with the present invention. For example, the fiber assembly 34 may include a first plurality of reinforcing fibers (not shown) and a second plurality of reinforcing fibers (not shown). A controller (not shown) may, at a first predetermined time, introduce the first plurality of reinforcing fibers to the polymer melt 30 for compounding within the deposition die head 32. The resulting fiber-reinforced polymer compound 25 then, for example, may include four (4) individual reinforcing fibers. The fiber-reinforced polymer compound 25 is deposited on the contact surface 18 of the compression mold 12 in those areas which correlate to the portions of the resulting fiber-reinforced polymer structural component which require less reinforcement. At a second predetermined time during the deposition of the fiber-reinforced polymer compound 25, the controller may introduce the second plurality of reinforcing fibers to the polymer melt 30 within the die head 32. The combination of the first and second pluralities of reinforcing fibers increases the concentration of the reinforcing fiber 40 within the resulting fiber-reinforced polymer compound 25. The second plurality of reinforcing fibers may include, for example, two (2) additional individual fibers thus increasing the plurality of reinforcing fibers 40 to comprise six (6) individual reinforcing fibers. The fiber-reinforced polymer compound 25 comprising the combination of the first and second pluralities of reinforcing fibers is then deposited on the contact surface 18 of the compression mold 12 in those areas which correlate to portions of the resulting fiber-reinforced polymer structural component requiring greater reinforcement.

The EDCM assembly 10 described herein allows direct feed compounding of the fiber-reinforced polymer compound 25, reducing the stress on fibers and minimizing fiber breakage during deposition. The EDCM assembly 10 introduces the at least one reinforcing fiber 40 directly into the deposition die head 32 instead of into the extruder 22 as in conventional compounding procedures. The EDCM assembly 10 does not subject the fibers to the shearing and heat of the extruder screw 28, reducing damage and breakage of the fiber and eliminating wear on the screw 28 and on the extruder 22 in general. Thusly, the fiber-reinforced structural component produced will exhibit higher mechanical properties, particularly in impact strength, and the extruder 22 will require less maintenance.

The EDCM assembly 10 enables the variation of the fiber percentage within the fiber-reinforced polymer compound 25, further enhancing the mechanical properties of the produced fiber-reinforced polymer structural component and allowing flexibility in the manufacture thereof. The EDCM assembly 10 also eliminates the complex mechanisms and processes required for conventional direct-feed and pultrusion compounding methods, reducing equipment capital and maintenance costs. The three-dimensional maneuvering capability of the extrusion deposition compounding device 20 enables the deposition of the fiber-reinforced polymer compound 25 directly on the compression mold 12 in any manner as desired, giving flexibility to the formation of the fiber-reinforced polymer structural component.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An in-line compounding and extrusion deposition molding apparatus for producing a fiber-reinforced molded structural component, the apparatus comprising:
   an extruder device having a barrel with an internal cavity formed therein and an extruder screw rotatably disposed within the internal cavity for producing a melt;
   a deposition die head disposed at a first end of the extruder device, the deposition die head having a die channel formed therein, the deposition die head for receiving the melt from the barrel;
   at least one fiber source for feeding at least one reinforcing fiber element into the die channel for compounding the at least one reinforcing fiber element with the melt to produce a fiber-reinforced compound; and
   a mold for receiving the fiber-reinforced compound and producing the fiber-reinforced molded structural component.

2. The apparatus of claim 1 wherein the die channel further includes a first opening in fluid communication with the internal cavity and a second opening for depositing the fiber-reinforced melt in the mold.

3. The apparatus of claim 2 further comprising:
   a cutting member movably mounted proximate the second opening of the die channel; and
   a cutting member actuator operatively connected to the cutting member, wherein activation of the cutting member actuator drives the cutting member to contact and sever the fiber-reinforced compound at the second opening of the deposition die head.

4. The apparatus of claim 1 wherein the at least one fiber source includes means for feeding an elongated continuous fiber into the die channel.

5. The apparatus of claim 1 wherein the at least one fiber source comprises a tensioning reel having the at least one reinforcing fiber element wound thereabout at a predetermined tension, the at least one reinforcing fiber element traversing a tension pulley coupled to the barrel, the tension pulley maintaining the predetermined tension of the at least one reinforcing fiber element as it is fed into the die channel.

6. The apparatus of claim 1 further comprising:
   a heating device for heating the at least one reinforcing fiber element to a predetermined temperature prior to the at least one reinforcing fiber element entering the die channel of the deposition die head.

7. The apparatus of claim 6 wherein the heating device comprises a fiber preheat die disposed on the barrel between the at least one fiber source and a tension pulley mounted on the barrel.

8. The apparatus of claim 1 wherein the deposition die head is formed of a plurality of dies, each die partially defines the die channel so that when the dies are assembled, the die channel is formed.

9. The apparatus of claim 1 wherein the deposition die head comprises an upper portion, a first lower portion, and a second lower portion, the upper portion and the second lower portion releasably mounted to the first lower portion, the first lower portion releasably mounted to the barrel, the upper portion, the first lower portion, and the second lower portion each having melt channels disposed oppositional to form the die channel upon assembly of the deposition die head.

10. The apparatus of claim 9 wherein the upper portion includes a first surface and a second surface disposed opposite thereto, the first surface having a tension pulley disposed thereon, the second surface having the melt channel formed therein, the melt channel having a first end proximate the barrel and a second end distal the barrel wherein the melt channel at the first end is tapered to the barrel.

11. The apparatus of claim 9 wherein the first lower portion includes a first surface, a second surface, and the melt channel formed continuously on the first and second surfaces, the melt channel having a first end on the first surface proximate the barrel and a second end on the second surface distal the barrel wherein the melt channel at the first end is tapered to the barrel.

12. The apparatus of claim 1 wherein the die channel is contoured for facilitating the wet-out process of the at least one reinforcing fiber element.

13. The apparatus of claim 1 wherein the deposition die head further includes a plurality of shear pulleys disposed in the die channel wherein the at least one reinforcing fiber element traverses the plurality of shear pulleys so that the at least one reinforcing fiber element is maintained under a predetermined tension as it travels through the die channel.

14. The apparatus of claim 1 wherein the at least one fiber source includes means for feeding a fiber bundle forming a plurality of reinforcing fibers into the die channel.

15. The apparatus of claim 1 wherein the mold is a compression mold.

16. An in-line compounding and extrusion deposition molding apparatus for producing a fiber-reinforced molded structural component, the apparatus comprising:
   an extruder device having a barrel with an internal cavity formed therein and an extruder screw rotatably disposed within the internal cavity for producing a melt;
   a deposition die head disposed at a first end of the extruder device, the deposition die head having a die channel formed therein, the deposition die head for receiving the melt from the barrel;
   at least one fiber source for feeding at least one reinforcing fiber element into the die channel for compounding the at least one reinforcing fiber element with the melt to produce a fiber-reinforced compound, wherein the deposition die head includes a tensioning member for maintaining the at least one reinforcing fiber element at a predetermined tension as it is fed into and travels within the die channel; and
   a mold for receiving the fiber-reinforced compound and producing the fiber-reinforced molded structural component.

17. The apparatus of claim 16 wherein the deposition die head is formed of a plurality of dies, each die partially defines the die channel so that when the dies are assembled, the die channel is formed.

\* \* \* \* \*